Figure 1:
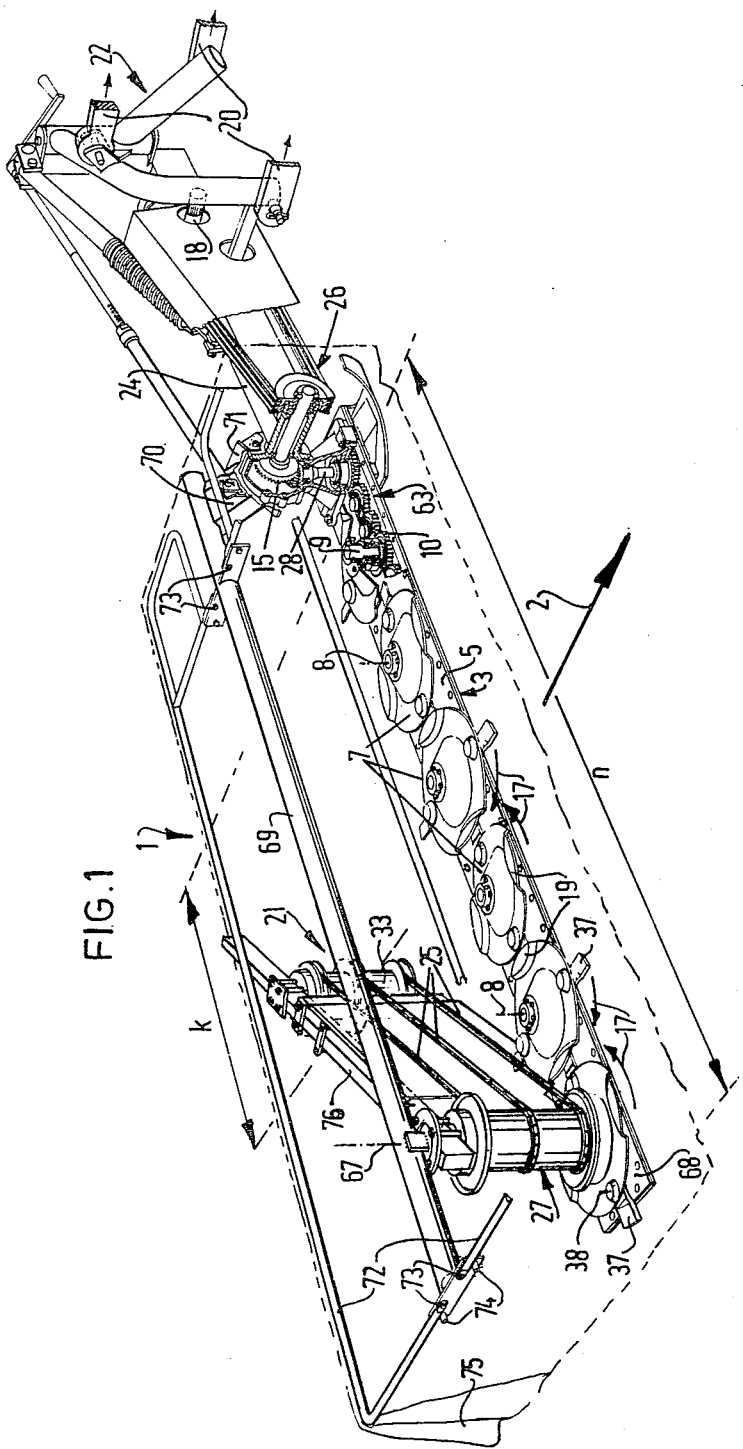

United States Patent [19]

Oosterling et al.

[11] 4,275,547
[45] Jun. 30, 1981

[54] MOWING DEVICE

[75] Inventors: Pieter A. Oosterling; Hendricus C. van Staveren, both of Nieuw-Vennep, Netherlands

[73] Assignee: Multinorm, B.V., Nieuw-Vennep, Netherlands

[21] Appl. No.: 49,598

[22] Filed: Jun. 18, 1979

[30] Foreign Application Priority Data

Jun. 20, 1978 [NL] Netherlands .................. 7806654

[51] Int. Cl.³ ............................................ A01D 55/18
[52] U.S. Cl. ...................................... 56/13.6; 56/192
[58] Field of Search ............... 56/13.6, 192, 295, 17.5

[56] References Cited

U.S. PATENT DOCUMENTS

| 3,772,865 | 11/1973 | Ruprecht | 56/192 |
| 4,037,390 | 7/1977 | Vogelenzang | 56/192 |
| 4,050,224 | 9/1977 | Oosterling et al. | 56/192 |
| 4,166,350 | 9/1979 | Werner | 56/13.6 |

FOREIGN PATENT DOCUMENTS

| 1582369 | 12/1967 | Fed. Rep. of Germany | 56/192 |
| 1582355 | 4/1970 | Fed. Rep. of Germany | 56/192 |
| 2317869 | 2/1977 | France | 56/192 |
| 6714322 | 4/1969 | Netherlands | 56/192 |
| 6915153 | 4/1970 | Netherlands | 56/192 |
| 7700541 | 7/1978 | Netherlands | 56/192 |

Primary Examiner—Jay N. Eskovitz
Attorney, Agent, or Firm—Diller, Ramik & Wight

[57] ABSTRACT

The girder of a mowing device above which cutting members are arranged and which is destined to be suspended to the side of a tractor, is being loaded heavily on bending and/or torsion if the girder comprises remote from the end of the tractor a swath former. Therefore, the swath former is carried by a carrier extending on high level.

36 Claims, 5 Drawing Figures

MOWING DEVICE

The invention relates to a mowing device comprising a girder extending transversely of the direction of movement of the mower, a plurality of cutting members rotatably journalled on said girder and arranged above the latter, a cutting driving gear arranged on or in the girder and driving the cutting members, a carrier extending transversely of the direction of movement and at least one swath former comprising at least one rotor rotatable about an upwardly extending axis and journalled on said carrier, one end of the girder being connected with a suspension frame to be hitched to a vehicle, whilst each cutting member comprises at least one cutter fastened to its periphery and the swath former is arranged at the end of the mower remote from the suspension frame.

Such a mower is known from German patent application no. 1.582.369.

The invention has for its object to enlarge the mowing width and to maintain a comparatively small width of the swath so that the swath of cut grass can be readily treated, for example, tedded and picked up by conventional hay-making machines, whilst the wheels of a prime mover can pass on either side over the swath. It is furthermore a condition in this case that the girder holding the driving gear should not bend excessively and/or be torsioned when it has a great length in the case of a large mowing width. According to the invention this is achieved in that the swath former is essentially formed by said rotor arranged at one end of the mower, a reversing roller extending rearwardly away from the end of the mower and rotatably journalled on the carrier and at least one endless, flexible swath forming member arranged between the former and in that the end of the girder remote from the suspension frame is supported by the carrier via a rotational bearing and via a suspension element arranged centrally in the rotor of the swath former and engaging a cutting disc. The bending and/or torsional load of the girder by the weight of the swath former is thus avoided, since the swath former is not journalled on the girder of the stream of crop it can be proportioned so that it is sufficiently strong to carry the additional weight of the swath former.

From Dutch patent application No. 6512120 a mowing device is known in which the bending load is reduced in that a carrier engages a rearwardly directed console of the girder and thus supports part of the weight of the mowing device. However, in carrying this part of the weight the comparatively long girder is torsioned to a high extent as a result of which the interengagement of the elements of the cutting driving gear becomes imperfect.

The above-mentioned and further features of the invention will be set out in the following description with reference to a few embodiments of the mowing device in accordance with the invention.

The drawing shows in

Figure 2:
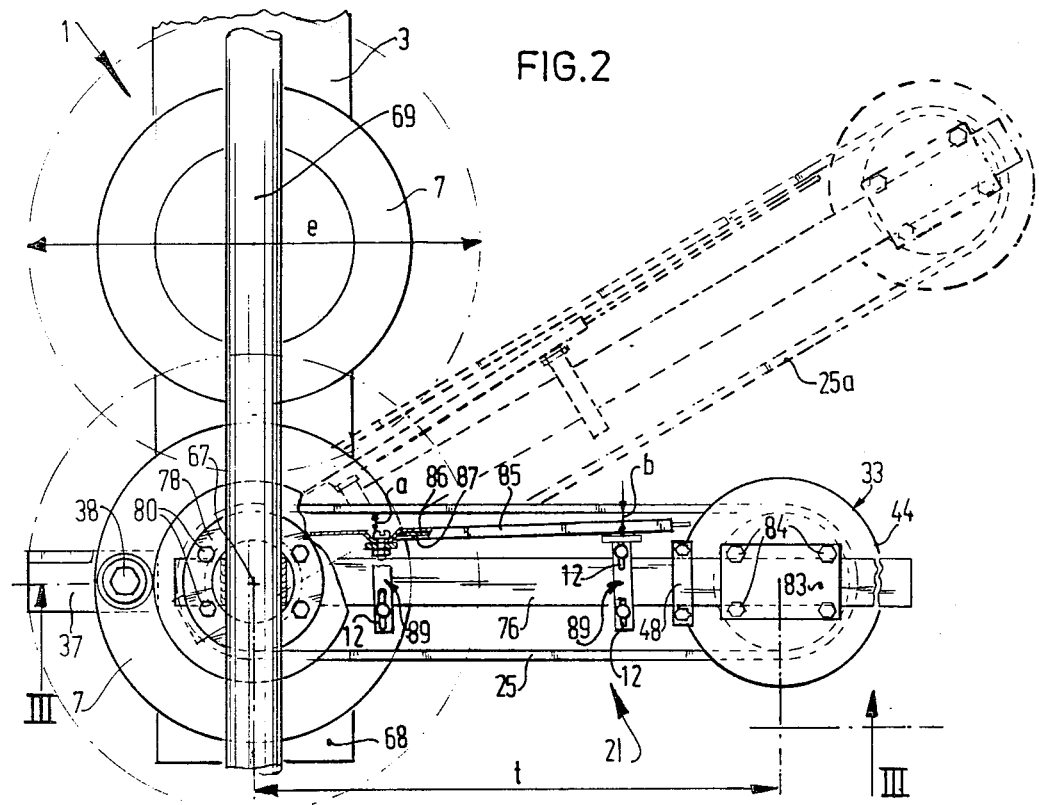
Figure 3:
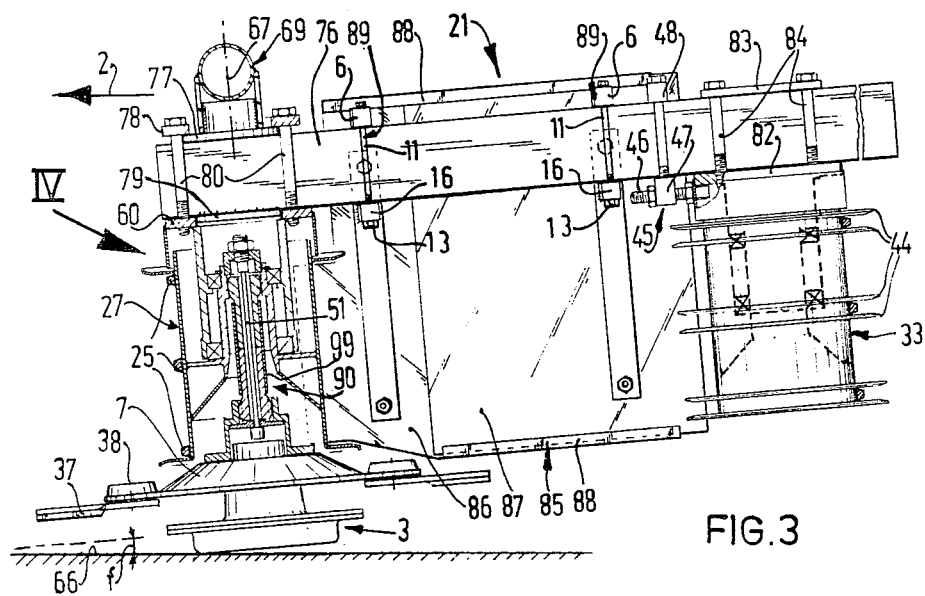
Figure 4:
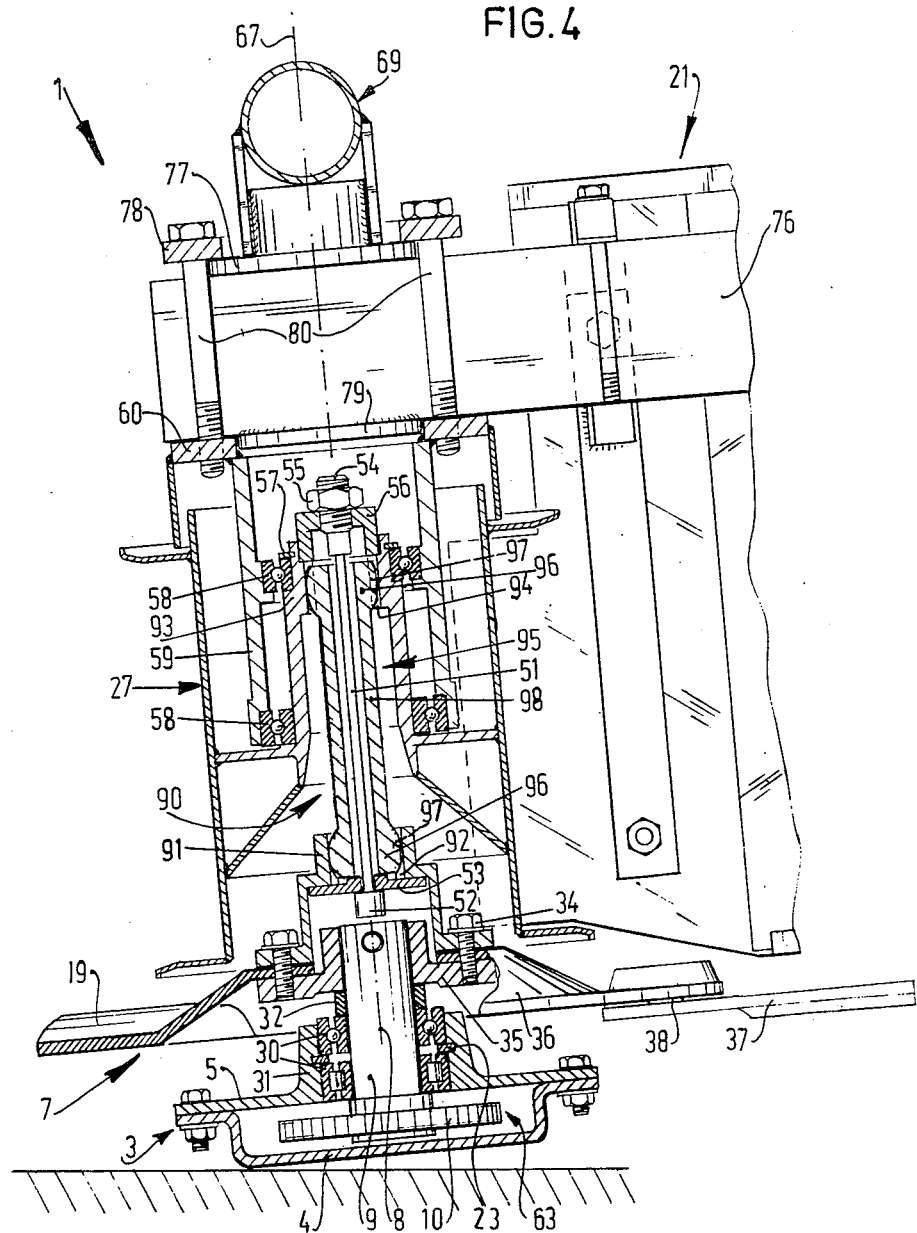
Figure 5:
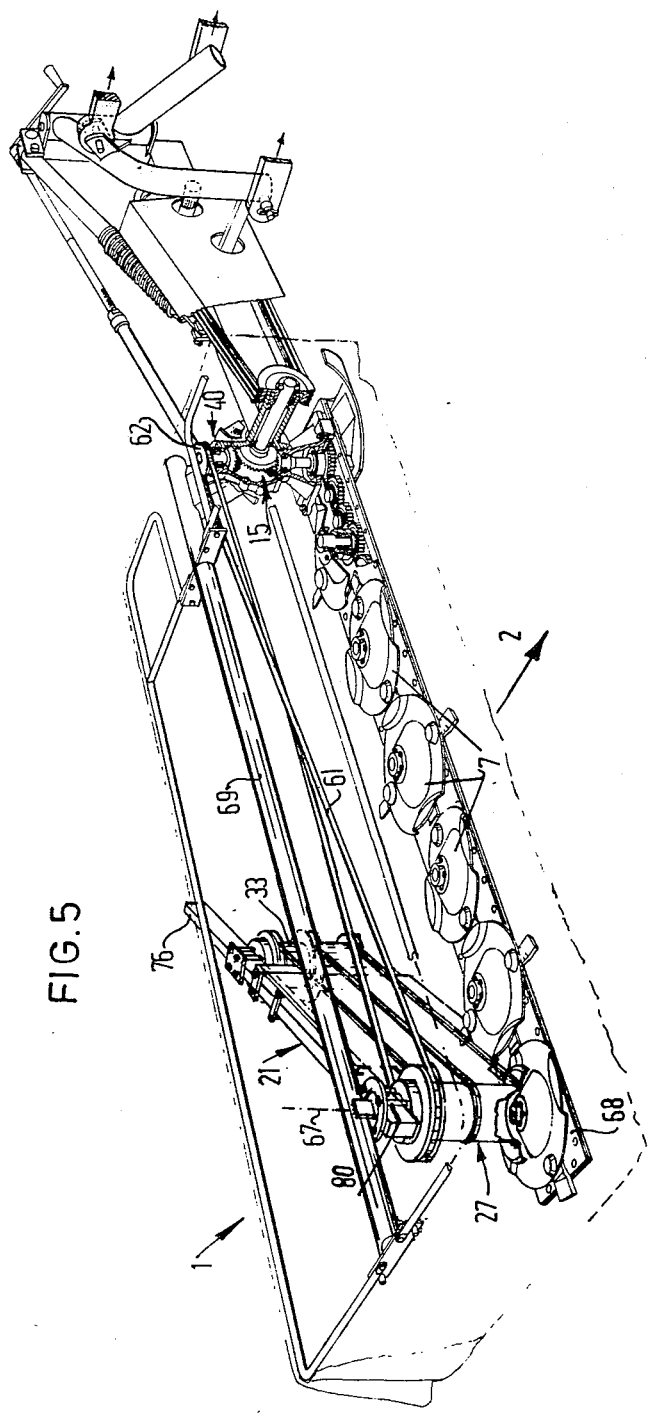

FIGS. 1 and 5 a perspective view partly broken away of a mower in accordance with the invention, FIG. 2 an enlarged plan view partly broken away of the mower of FIG. 1, FIG. 3 a sectional view taken on the line III—III in FIG. 2, and FIG. 4 on an enlarged scale a detail IV of FIG. 3.

The mowing device 1 of FIG. 1 is connected by means of an auxiliary frame 24 with a framework 20 suspended to the suspension bars 20 of a tractor (not shown) and it is driven through a bevel pinion drive 15 and a rope drive 26 via an universal shaft 18 by the power take-off shaft of the tractor.

The mowing device 1 according to the invention comprises a flat, elongated girder extending transversely of the direction of movement 2 and forming a housing 3 essentially comprising a trough 4 and a cover 5 secured thereto. On the housing 3 a plurality of cutting members 7 are journalled so as to be rotatable about standing axes 8. The cutting members 7 are arranged near and above the housing 3 and will rotate pairwise in opposite directions 17. Each cutting member 7 is rigidly connected by means of a shaft 9 with a pinion 10 of a driving gear 63 arranged in the housing 3 comprising a sequence of pinions 10 and being driven through a shaft 28 by the bevel pinion drive 15.

The shaft 9 of each cutting member 7 is rotatably journalled in an upwardly extending collar 31 of the cover 5 by means of ball bearings 30 and guard rings 23 and a spacer sleeve 32.

Each cutting member 7 comprises a disc 36 fastened by means of screws 34 to a hub 35 and at least one, for example, two cutters 37 fastened to the periphery of the disc 36. The cutters 37 brush past beneath neighbouring discs 36 without touching them, to which end the discs 36 have bulging parts 19. The cutters 37 of neighbouring cutting members 7 are relatively shifted through an angle of 90° so that they do not touch one another although the cutter paths overlap. Each cutter 37 is freely rotatable about a pin 38.

The mowing device 1 has a low structure throughout the mowing width and the shape of the cutting members 7 is such that the mowing device 1 can readily slide below the mown crop. The circumferential speed of the cutters 37 is very high, for example, about 80 ms/sec with a circumferential diameter e of 45 to 50 cms.

During the mowing operation the mowing device 1 is held in a slightly forwardly inclined position so that the cutting members are at an angle f to the ground surface 66.

At least one of the two ends and preferably at the end remote from the auxiliary frame 24 the device shown in FIG. 1 has a swath former 21 comprising a rotor 27 rotatably driven about a standing axis 67. The swath former 21 essentially comprises said rotor 27 arranged at the end 68 of the mowing device 1, a reversing roller 33 extending rearwardly away from the end 68 of the mowing device 1 and at least one endless, flexible member arranged between the former and preferably formed by three ropes 25.

The mowing device 1 furthermore comprises a carrier 69 extending transversely of the direction of movement 2 and formed by a solid tube rigidly connected with the housing 71 of the bevel pinion transmission 15 by an arm 70. Two screen frameworks 72 are arranged on the carrier 69 so as to be tiltable about pins 73 and in the working position they bear on stops 74 so that they can carry a flexible screen 75.

According to the invention the rotor 27 of the swath former 21 is journalled on the carrier 69 by means of an inner sleeve 93 welded to the rotor 27 and being locked in an axial direction by means of a circlip 57 and with the aid of ball bearings 58 supported in a sleeve 59, which is suspended by means of a supporting ring 60 to the carrier 69. The swath former 21 furthermore comprises a frame beam 76 suspended to the carrier 69. The carrier 69 is rigidly connected with an annular collar 77. The frame beam 76 is suspended to the annular collar 77 by means of a ring 78 bearing on the annular collar 77, of a centering ring 79 welded to the bottom side of the frame beam 76, of the supporting ring 60 and of four screws 80 interconnecting the ring 78 and the supporting ring 60 and can be fixed to the carrier 69 in various angular positions (see FIG. 2), when the screws 80 are loosened, so that the reversing roller 33 is adjustable about the rotary axis 67 of the rotor 27. The reversing roller 81 is rotatably journalled on a console 82 carried by the frame beam 76 and being displaceable in the axial direction of the frame beam 76 by means of a clamping plate 83 and bolts 84 so that the centre-to-centre distance t between the rotor 27 and the reversing roller 33 is variable in order to obtain a different swath width by using other ropes 25a of different length with the same angular distance of the frame beam 76. The ropes 25 guided along collars 44 of the reversing roller 33 can be stretched by means of a stretching device 45 engaging the console 82 and formed by a screw spindle 46 extending through a tapped hole 47 in a bracket 48 clamped to the frame beam 76.

The swath former 21 furthermore comprises a guide plate 85 arranged between the rotor 27 and the reversing roller 33 and consisting of two relatively slidable overlapping plate portions 86 and 87, which are suspended by means of releasable brackets 89 gripping around the frame beam 76 to said frame beam 76. The plate portion 86 engages the plate portion 87 by bent-over rims 88. The brackets 89 each consist of a horizontal strip 16 welded to a plate portion 86, 87, a horizontal strip 6, two bolts 11 passing through elongated holes 12 in the strips 16 and 6 and two nuts 13 so that the guide plate 85 can be fixed to the frame beam 76 at an adjustable distance a and b respectively from the ropes 25.

The rotor 27 of the mowing device 1 shown in FIG. 1 is driven by a cutting member 7 and is coupled to this end with the cutting member 7 through a flexible coupling 90 comprising a sleeve 91 having internal toothing 92 and fastened by means of screws 34 to a cutting member 7, the aforesaid internal sleeve 93 welded to the rotor 27 and having internal toothing 94 and a coupling member 95, two spherical heads 96 of which engage by round toothing 97 the toothings 92 and 94. The coupling member 95 has two halves 98 rigidly interconnected by means of a pressing sleeve 99. Through the flexible coupling 90 extends centrally a suspension element 51 rotating together with the rotor 27 for suspending the outermost cutting member 7 and hence the end 68 of the housing 3 to the carrier 69. The suspension element 51 consists of a bar with a foot 52, which engages via a ring 53 the bottom side of the sleeve 91, the bar having a screw head 54 which engages the inner sleeve 93 of the rotor 27 via a nut 55 and a sleeve 56. The nut 55 is screwed onto the head 54 in a manner such that the housing 3 and the carrier 69 are interconnected under bias stress. This means that, when the mowing device 1 is standing on a flat ground the housing 3 hangs by an important part of weight on the carrier 69 so that when the end 68 of the housing 3 is not supported, this housing 3 will bend down to a lesser extent than in the absence of said bias stress. According to the invention the housing 3 is not exposed to bending or rational stress by the weight of the rotor 27 or any other part of the swath former 21. On the contrary, since the housing 3 is suspended to the carrier 69 under bias stress, bending of the housing 3 under the weight of the driving gear 63, the cutting members 7 and any crop bearing thereon is reduced. The invention is particularly important for mowing devices having a large mowing width n of more than 2 meters, for example, 2.4 ms with six or 3.2 ms with eight cutting members 7. Despite the large mowing width n the mowing device 1 permits of obtaining a comparatively small width k of the swath.

The mowing device 1 shown in FIG. 5 is essentially identical to that of FIG. 1, but herein the rotor 27 of the swath former 21 is driven through a swath former driving gear 40 located above the cutting members 7 and carried separately by the carrier 69 and comprising a rope 61 engaging the rotor 27 and a rope disc 62 driven by the bevel pinion drive 15. The number of revolutions of the rotor 27 may differ from that of the cutting members 7.

What we claim is:

1. A mowing device comprising a girder extending transversely of the direction of movement of the mower, a plurality of cutting members rotatably journalled on said girder and arranged above the same, a cutting driving gear for the cutting members arranged on or in the girder, a carrier extending transversely of the direction of movement and at least one swath former comprising at least one driven rotor rotatable about an upwardly extending axis and journalled on the carrier, one end of the girder being connected with a suspension framework to be hitched to a vehicle, whilst each cutting member has at least one cutter fastened to its periphery and the swath former is arranged at the end of the mowing device remote from the suspension framework, characterized in that the swath former essentially comprises the said rotor arranged at one end of the mower, a reversing roller extending rearwardly away from the end of the mower and rotatably journalled on the carrier and at least one endless, flexible swath-forming member arranged between the former and in that the end of the girder remote from the suspension framework is carried by said carrier through a rotational bearing and a suspension element centrally arranged in the rotor of the swath former and engaging a cutting disc.

2. A mowing device as claimed in claim 1 characterized in that the suspension element is movable with respect to the rotor.

3. A mowing device as claimed in claim 1 characterized in that the rotor of the swath former is driven through a separate swath-former driving gear located above the cutting members.

4. A mowing device comprising a girder extending transversely of the direction of movement of the mower, a plurality of cutting members rotatably journalled on said girder and arranged above the same, a cutting driving gear for the cutting members arranged on or in the girder, a carrier extending transversely of the direction of movement and at least one swath former comprising at least one driven rotor rotatable about an upwardly extending axis and journalled on the carrier, one end of the girder being connected with a suspension framework to be hitched to a vehicle, whilst each cutting member has at least one cutter fastened to its periphery and the swath former is arranged at the end of the mowing device remote from the suspension framework, characterized in that the swath former essentially comprises the said rotor arranged at one end of the mower, a reversing roller extending rearwardly away from the end of the mower and rotatably journalled on the carrier and at least one endless, flexible swath-forming member arranged between the former and in that the end of the girder remote from the suspension framework is carried by said carrier through a rotational bearing and a suspension element centrally arranged in the rotor of the swath former and engaging a cutting disc, the rotor being coupled with the cutting member through a flexible coupling.

5. A mowing device as claimed in claim 3 characterized in that the number of revolutions of the driven rotor of the swath former differs from that of the cutting members.

6. A mowing device as claimed in claim 4 characterized in that through the flexible coupling extends centrally a suspension element rotating together with the rotor for suspending the outermost cutting member and hence the end of the girder to the carrier.

7. A mowing device as claimed in claim 1 characterized in that the rotor of the swath former is driven by a cutting member.

8. A mowing device as claimed in anyone of claims 1, 2, 4, 6 or 5 characterized in that the carrier of the rotor of the swath former serves, in addition, for supporting a protective device.

9. A mowing device as claimed in anyone of claims 1, 2, 4, 6 or 5 characterized in that the driving gear driving the cutting members is driven only from the end of the mower facing the prime mover.

10. A mowing device as claimed in claim 9 characterized in that the working width of the swath former is adjustable.

11. A mowing device as claimed in claim 10 characterized in that the reversing roller is displaceable about the rotary axis of the rotor.

12. A mowing device as claimed in claim 10 characterized in that the girder and the carrier are interconnected under bias stress.

13. A mowing device as claimed in anyone of claims 1, 2, 4, 6 or 5 characterized in that the centre-to-centre distance between the rotor and the reversing roller of the swath former is adjustable.

14. A mowing device as claimed in claim 13 characterized in that the carrier is connected with a frame beam of the swath former and in that the reversing roller is rotatably journalled on a console supported by the frame beam.

15. A mowing device as claimed in claim 14 characterized in that the console is arranged on the frame beam so as to be displaceable in the axial direction of the latter.

16. A mowing device as claimed in claim 14 characterized in that the carrier is rigidly connected with an annular collar and the frame beam can be fixed to the annular collar in different angular positions.

17. A mowing device as claimed in claim 9 characterized in that the swath former comprises a guide plate disposed between the rotor and the reversing roller and consisting of two relatively slidable overlapping plate portions, at least one of which is displaceable in an axial direction of a frame beam of the swath former.

18. A mowing device as claimed in claim 9 characterized in that the swath former comprises at least one guide plate disposed between the rotor and the reversing roller and fastened at an adjustable distance from the endless, flexible member to a frame beam of the swath former.

19. A mowing device as claimed in claim 11 characterized in that the girder and the carrier are interconnected under bias stress.

20. A mowing device as claimed in claim 15 characterized in that the carrier is rigidly connected with an annular collar and the frame beam can be fixed to the annular collar in different angular positions.

21. A mowing device as claimed in claim 10 characterized in that the swath former comprises a guide plate disposed between the rotor and the reversing roller and consisting of two relatively slidable overlapping plate portions, at least one of which is displaceable in an axial direction of a frame beam of the swath former.

22. A mowing device as claimed in claim 11 characterized in that the swath former comprises a guide plate disposed between the rotor and the reversing roller and consisting of two relatively slidable overlapping plate portions, at least one of which is displaceable in an axial direction of a frame beam of the swath former.

23. A mowing device as claimed in claim 11 characterized in that the swath former comprises a guide plate disposed between the rotor and the reversing roller and consisting of two relatively slidable overlapping plate portions, at least one of which is displaceable in an axial direction of a frame beam of the swath former.

24. A mowing device as claimed in claim 13 characterized in that the swath former comprises a guide plate disposed between the rotor and the reversing roller and consisting of two relatively slidable overlapping plate portions, at least one of which is displaceable in an axial direction of a frame beam of the swath former.

25. A mowing device as claimed in claim 14 characterized in that the swath former comprises a guide plate disposed between the rotor and the reversing roller and consisting of two relatively slidable overlapping plate portions, at least one of which is displaceable in an axial direction of a frame beam of the swath former.

26. A mowing device as claimed in claim 15 characterized in that the swath former comprises a guide plate disposed between the rotor and the reversing roller and consisting of two relatively slidable overlapping plate portions, at least one of which is displaceable in an axial direction of a frame beam of the swath former.

27. A mowing device as claimed in claim 16 characterized in that the swath former comprises a guide plate disposed between the rotor and the reversing roller and consisting of two relatively slidable overlapping plate portions, at least one of which is displaceable in an axial direction of a frame beam of the swath former.

28. A mowing device as claimed in claim 10 characterized in that the swath former comprises at least one guide plate disposed between the rotor and the reversing roller and fastened at an adjustable distance from the endless, flexible member to a frame beam of the swath former.

29. A mowing device as claimed in claim 10 characterized in that the swath former comprises at least one guide plate disposed between the rotor and the reversing roller and fastened at an adjustable distance from the endless, flexible member to a frame beam of the swath former.

30. A mowing device as claimed in claim 11 characterized in that the swath former comprises at least one guide plate disposed between the rotor and the reversing roller and fastened at an adjustable distance from the endless, flexible member to a frame beam of the swath former.

31. A mowing device as claimed in claim 13 characterized in that the swath former comprises at least one guide plate disposed between the rotor and the reversing roller and fastened at an adjustable distance from the endless, flexible member to a frame beam of the swath former.

32. A mowing device as claimed in claim 14 characterized in that the swath former comprises at least one guide plate disposed between the rotor and the reversing roller and fastened at an adjustable distance from the endless, flexible member to a frame beam of the swath former.

33. A mowing device as claimed in claim 15 characterized in that the swath former comprises at least one guide plate disposed between the rotor and the reversing roller and fastened at an adjustable distance from the endless, flexible member to a frame beam of the swath former.

34. A mowing device as claimed in claim 16 characterized in that the swath former comprises at least one guide plate disposed between the rotor and the reversing roller and fastened at an adjustable distance from the endless, flexible member to a frame beam of the swath former.

35. A mowing device comprising, in combination:
a frame adapted to be attached to a powered vehicle;
an elongate girder secured at one end to said frame and extending in cantilever fashion therefrom in a direction transverse to the direction in which the mowing device travels in use;
an elongate carrier secured at one end to said frame and extending in cantilever fashion therefrom above said girder;
a plurality of cutting means rotatably supported by said girder in spaced succession along the length thereof;
drive means for rotating said cutting means; and
support means interconnecting said carrier and one of said cutting means adjacent that end of said girder remote from said frame for suspending said end of the girder from said carrier through said one cutting means, said support means being formed in part by a hollow swath-forming rotor rotatably supported by and depending from said carrier, said rotor extending downwardly into closely overlying relation to said one cutting means, and there being means for rotatably driving said rotor, said means last mentioned comprising a hollow drive shaft drivingly interconnecting said one cutting means with said rotor, said support means including a rod extending axially through said drive shaft.

36. A mowing device comprising, in combination:
a frame adapted to be attached to a powered vehicle;
an elongate girder secured at one end to said frame and extending in cantilever fashion therefrom in a direction transverse to the direction in which the mowing device travels in use;
an elongate carrier secured at one end to said frame and extending in cantilever fashion therefrom above said girder;
a plurality of cutting means rotatably supported by said girder in spaced succession along the length thereof;
drive means for rotating said cutting means; and
support means interconnecting said carrier and one of said cutting means adjacent that end of said girder remote from said frame for suspending said end of the girder from said carrier through said one cutting means, said support means being formed in part by a hollow swath-forming rotor rotatably supported by and depending from said carrier, said rotor extending downwardly into closely overlying relation to said one cutting means, and there being means for rotatably driving said rotor, said means last mentioned comprising a second drive means connected to said rotor for driving the rotor at a speed different from that of said one cutting means.

* * * * *